US012431664B2

(12) United States Patent
Seon

(10) Patent No.: US 12,431,664 B2
(45) Date of Patent: Sep. 30, 2025

(54) CONNECTOR

(71) Applicant: LG Energy Solution, Ltd., Seoul (KR)

(72) Inventor: Sang-Ok Seon, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 408 days.

(21) Appl. No.: 18/004,938

(22) PCT Filed: Apr. 15, 2022

(86) PCT No.: PCT/KR2022/005495
§ 371 (c)(1),
(2) Date: Jan. 10, 2023

(87) PCT Pub. No.: WO2022/231186
PCT Pub. Date: Nov. 3, 2022

(65) Prior Publication Data

US 2023/0344167 A1 Oct. 26, 2023

(30) Foreign Application Priority Data

Apr. 28, 2021 (KR) ........................ 10-2021-0055302

(51) Int. Cl.
*H01R 13/62* (2006.01)
*H01R 13/514* (2006.01)
*H01R 13/623* (2006.01)

(52) U.S. Cl.
CPC ....... *H01R 13/6205* (2013.01); *H01R 13/514* (2013.01); *H01R 13/623* (2013.01)

(58) Field of Classification Search
None
See application file for complete search history.

(56) References Cited

U.S. PATENT DOCUMENTS 9,196,979 B2 11/2015 Kim
11,374,353 B2 * 6/2022 Johnson ............ H01R 13/6205
(Continued)

FOREIGN PATENT DOCUMENTS

CN 111030217 A 4/2020
CN 112018559 A 12/2020
(Continued)

OTHER PUBLICATIONS

International Search Report for Application No. PCT/KR2022/005495 mailed Jul. 25, 2022, pp. 1-2.
(Continued)

*Primary Examiner* — Ross N Gushi
(74) *Attorney, Agent, or Firm* — Lerner David LLP

(57) ABSTRACT

Provided is a connector in which fastening and separation may be effectively performed. A connector electrically connected to a mating connector including a magnetic body includes a housing formed of an electrically non-conductive material, and including a coupling portion to which the mating connector is fastened, a conductor unit formed of an electrically conductive material, and configured to provide an electrical path, wherein at least a part of the conductor unit is exposed to outside of the housing to electrically contact the mating connector, and a magnetic unit configured to so that a magnetic field is changeable with respect to the magnetic body of the mating connector.

9 Claims, 10 Drawing Sheets

(56) References Cited

U.S. PATENT DOCUMENTS

| | | | | |
|---|---|---|---|---|
| 11,791,590 | B2 * | 10/2023 | Klein .................... | H01R 31/06 439/39 |
| 2006/0183373 | A1 | 8/2006 | Finke et al. | |
| 2018/0191097 | A1 | 7/2018 | Yonnet | |
| 2018/0212369 | A1 | 7/2018 | Bulmer | |

FOREIGN PATENT DOCUMENTS

| | | | |
|---|---|---|---|
| JP | S5566388 | U | 5/1980 |
| JP | H06111886 | A | 4/1994 |
| JP | H10112354 | A | 4/1998 |
| JP | 3011150 | B2 | 2/2000 |
| JP | 2006309962 | A | 11/2006 |
| JP | 5171365 | B2 | 3/2013 |
| JP | 2017-112007 | A | 6/2017 |
| KR | 20090118537 | A | 11/2009 |
| KR | 20140112954 | A | 9/2014 |
| KR | 101805446 | B1 | 12/2017 |
| KR | 20180022938 | A | 3/2018 |
| KR | 102119646 | B1 | 6/2020 |
| KR | 20210006207 | A | 1/2021 |

OTHER PUBLICATIONS

Extended European Search Report including Written Opinion for Application No. 22796020.0 dated Feb. 8, 2024, pp. 1-9.

* cited by examiner

CONNECTOR

CROSS REFERENCE TO RELATED APPLICATIONS

The present application is a national phase entry under 35 U.S.C. § 371 of International Application No. PCT/KR2022/005495 filed Apr. 15, 2022, which claims priority to Korean Patent Application No. 10-2021-0055302 filed on Apr. 28, 2021 in the Republic of Korea, the disclosures of which are incorporated herein by reference.

TECHNICAL FIELD

The present disclosure relates to a connector, and more particularly, to a connector for transmitting power or an electrical signal and an application device including the connector.

BACKGROUND ART

A power cable for supplying power or a signal cable for transmitting a signal may be electrically connected through electrical connection between two connectors, for example, a male connector and a female connector. In this case, each of the two connectors may be provided with a conductor for electrical connection, for example, a pin. Also, the two connectors may be provided with a fastening member for mechanical connection, to stably maintain the electrical connection.

The mechanical connection between the two connectors may be typically made by inserting at least a part of the male connector into the female connector. In this case, the weaker the insertion force is, the better for fastening between the two connectors. For example, when the male connector is easily inserted into the female connector, an operation of coupling the two connectors may be more easily performed. In addition, once the two connectors are coupled to each other, it is preferable that the two connectors are coupled to each other with a strong fastening force. That is, in order to stably maintain the electrical connection between the two connectors, it is necessary to prevent the coupling between the two connectors from being easily released.

However, in general, when the insertion force is weakened to facilitate fastening between the two connectors, a coupling force between the two connectors may also be weakened, and thus, it may be difficult to stably maintain the coupled state. In contrast, when the coupling force between the two connectors is excessively high to stably maintain the coupled state, a lot of force may be required when coupling between the two connectors. In addition, in this case, when it is necessary to separate the two connectors in order to remove the electrical connection between the two connectors, there may be a difficulty in separation.

SUMMARY

Technical Problem

The present disclosure is designed to solve the problems of the related art, and therefore the present disclosure is directed to providing a connector in which fastening and separation may be effectively performed and an application device including the connector.

These and other objects and advantages of the present disclosure may be understood from the following detailed description and will become more fully apparent from embodiments of the present disclosure. Also, it will be easily understood that the objects and advantages of the present disclosure may be realized by the means shown in the appended claims and combinations thereof.

Technical Solution

In an aspect of the present disclosure, there is provided a connector electrically connected to a mating connector including a magnetic body, the connector including a housing formed of an electrically non-conductive material and comprising a coupling portion to which the mating connector is fastened, a conductor unit formed of an electrically conductive material, and configured to provide an electrical path, wherein at least a part of the conductor unit is exposed to outside of the housing to electrically contact the mating connector, and a magnetic unit configured to change a magnetic field with respect to the magnetic body of the mating connector.

The coupling portion of the housing may be formed as a concave groove into which at least a portion of the mating connector is inserted.

The coupling portion of the housing includes a thread formed on an inner surface of the groove and the mating connector is rotatably engageable with the groove.

The magnetic unit may include m a first magnet and a second magnet that are each configured as a multi-pole magnet facing each other.

The second magnet may be configured to be movable to adjust a distance between the first magnet and the second magnet.

The second magnet may be configured to be rotatable to adjust locations of poles of the second magnet facing each pole of the first magnet.

The second magnet may be plate shaped.

The magnetic unit may further include edge members formed of a ferromagnetic material, located on an edge of at least one of the first magnet and the second magnet, and spaced apart from each other for each pole.

In another aspect of the present disclosure, there is provided a battery pack including the connector.

In an aspect of the present disclosure, there is provided a vehicle including the connector.

In an aspect of the present disclosure, there is provided a device including the connector.

In an aspect of the present disclosure, there is provided a connecting device including the connector, and a mating connector coupled to the connector. In particular, in this case, the mating connector may include a magnetic body, and may be coupled to the connector to be electrically connectable.

Advantageous Effects

According to an aspect of the present disclosure, a connector in which fastening and separation may be effectively performed may be provided.

Furthermore, according to an embodiment of the present disclosure, a coupling force with a mating connector (external connector) may be appropriately adjusted according to a situation. For example, when a connector according to the present disclosure is a female connector, coupling and separation with a male connector that is a mating connector may be easily performed, and a fastening force in a coupled state may be stably maintained.

In particular, in the case of a connector according to an aspect of the present disclosure, fastening with a mating connector may be easily performed with a small force.

Also, in the case of a connector according to an aspect of the present disclosure, a coupled state with a mating connector may be stably maintained.

Also, in the case of a connector according to an aspect of the present disclosure, separation from a mating connector may be easily performed.

BRIEF DESCRIPTION OF THE DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

DETAILED DESCRIPTION

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the present disclosure, so it should be understood that other equivalents and modifications could be made thereto without departing from the scope of the present disclosure.

Figure 1:
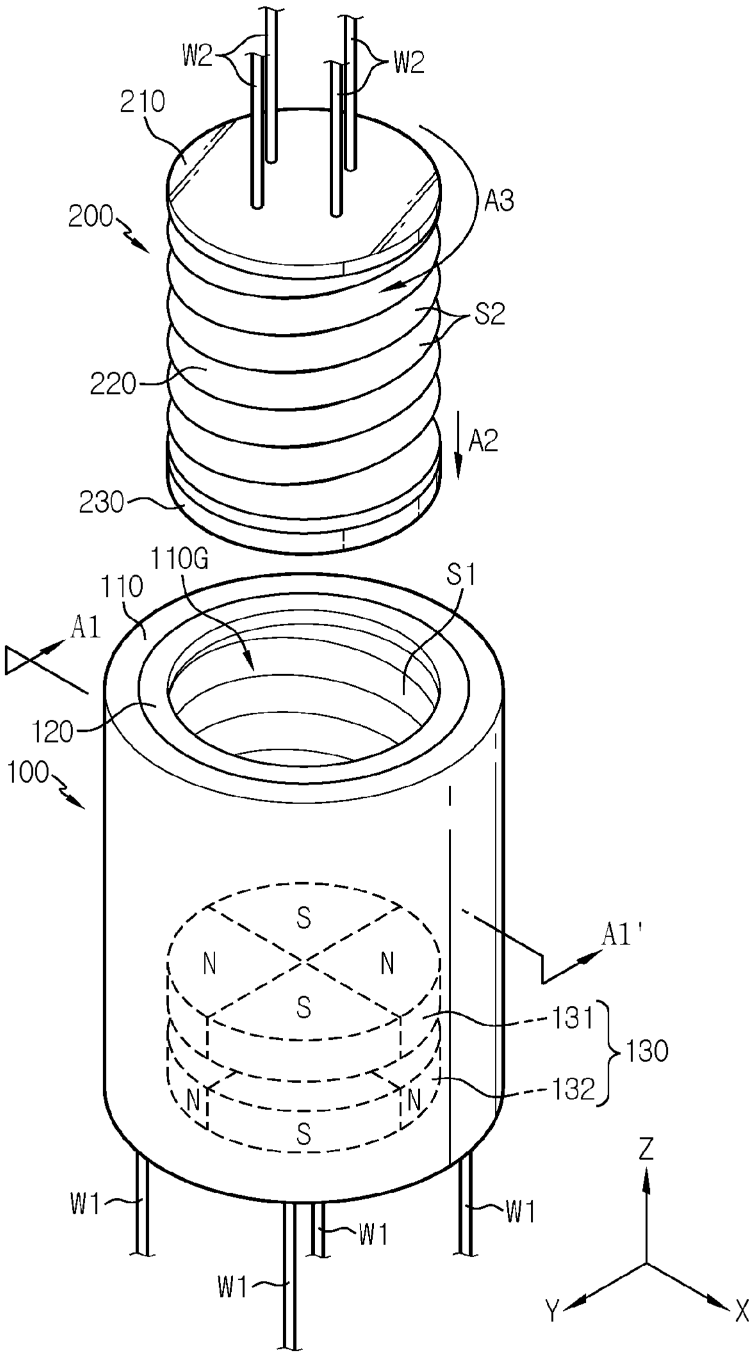
FIG. 1 is a perspective view schematically illustrating a configuration of a connector according to an embodiment of the present disclosure along with a mating connector.
Figure 2:
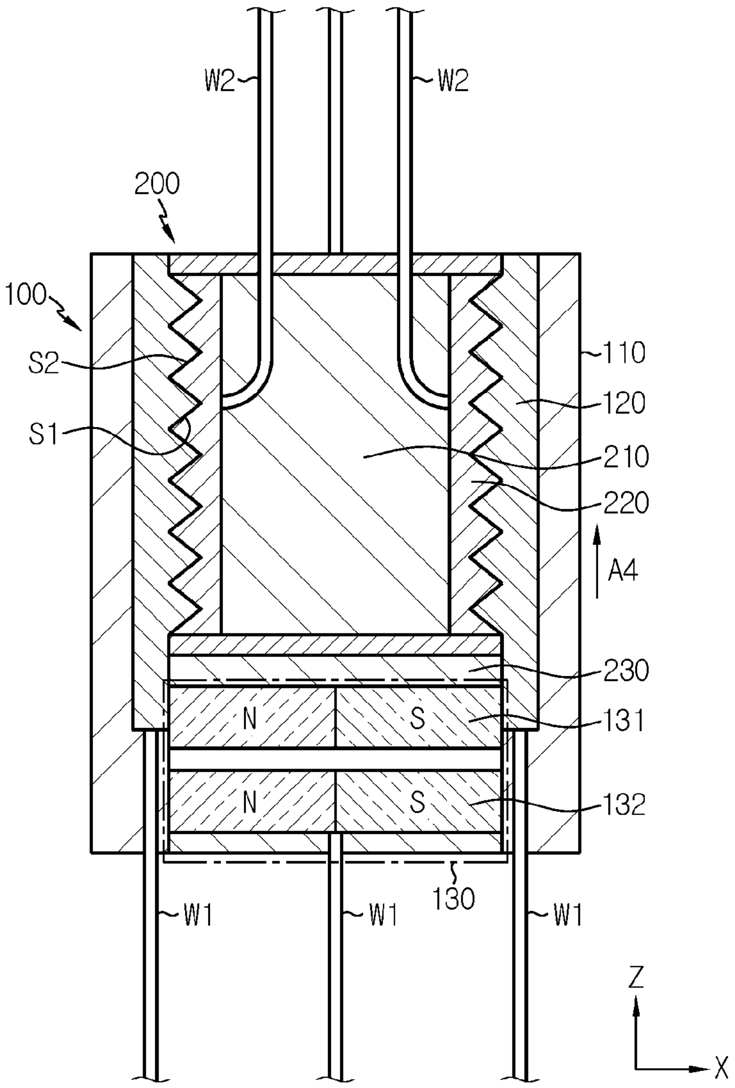
FIG. 2 is a cross-sectional view schematically illustrating a state where a mating connector is coupled to a connector according to an embodiment of the present disclosure.

FIG. 1 is a perspective view schematically illustrating a configuration of a connector 100 according to an embodiment of the present disclosure along with a mating connector 200. However, for convenience of explanation, the connector 100 is shown partially transparent in FIG. 1. Also, FIG. 2 is a cross-sectional view schematically illustrating a state where the mating connector 200 is coupled to the connector 100 according to an embodiment of the present disclosure. For example, FIG. 2 is a cross-sectional view taken along line A1-A1', in a state where the mating connector 200 is coupled to the connector 100 according to the present disclosure in the configuration of FIG. 1.

Referring to FIGS. 1 and 2, the connector 100 according to the present disclosure may be mechanically coupled to the mating connector 200 to be electrically connected. In this case, the mating connector 200 may include a main body 210 and a conductor contact portion 220, and may be mechanically fastened and electrically connected to the connector 100 according to the present disclosure. The main body 210 may be formed of an electrically insulating material, for example, a plastic material, and the conductor contact portion 220 may be formed of an electrically conductive material, for example, a metal material such as copper or nickel. The mating connector 200 may be electrically connected to the outside through a wire W2 (second wire).

Furthermore, the mating connector 200 connected to the connector 100 according to the present disclosure may include a magnetic body 230. The magnetic body 230 may refer to a magnetic material, that is, a material that is magnetized in a magnetic field. In particular, the magnetic body 230 of the mating connector 200 which is a material attracted by a magnet may be a ferromagnetic body. For example, the mating connector 200 may include a metal material such as iron, cobalt, or nickel as the magnetic body.

The connector 100 according to the present disclosure that is mechanically coupled to the mating connector 200 to be electrically connected includes a housing 110, a conductor unit 120, and a magnetic unit 130.

The housing 110 may be formed of an electrically non-conductive material. For example, the housing 110 may be formed of a material such as plastic. When the conductor unit 120 is electrically connected to the conductor contact portion 220 of the mating connector 200, the housing 110 may cause the conductor unit 120 to be electrically insulated from the outside without being exposed to the outside. Also, the housing 110 may be configured to be mechanically fastenable to the mating connector 200. In particular, the housing 110 may include a coupling portion 110G as shown in FIG. 1, and at least a part of the mating connector 200, for example, the main body 210 and the conductor contact portion 220, may be mechanically coupled to the coupling portion 110G.

The conductor unit 120 may be formed of an electrically conductive material and may be configured to provide an electrical path. For example, the conductor unit 120 may be formed of a material such as copper or nickel, and may allow power or an electrical signal to flow. Also, at least a part of the conductor unit 120 may be exposed to the outside of the housing 110 to electrically contact the mating connector 200. For example, the conductor unit 120 may be mainly buried in the housing 110 formed of an electrically insulating material, but a portion of the conductor unit 120 may be exposed to the outside of the housing 110. In a more specific example, referring to FIGS. 1 and 2, the conductor unit 120 may be exposed on a surface of the coupling portion 110G to which the mating connector 200 is coupled. Accordingly, when the mating connector 200 is coupled, the conductor contact portion 220 of the mating connector 200 may directly contact an exposed portion of the conductor unit 120. Hence, in this case, electrical connection may be made between the conductor contact portion 220 of the mating connector 200 and the conductor unit 120 of the connector 100 according to the present disclosure. That is, the portion of the conductor unit 120 exposed to the outside of the housing 110 may function as an electrical contact point electrically connected to the mating connector 200.

The other end of the conductor unit 120 may be connected to a wire W1 (first wire), and the conductor unit 120 may transmit and receive power or an electrical signal with a device (e.g., a battery pack) on which the connector 100 is mounted, through the first wire W1.

The magnetic unit 130 may be configured so that a magnetic field is changeable with respect to the mating connector 200 connected to the connector 100 according to the present disclosure. In particular, the mating connector 200 may include the magnetic body 230 such as iron, and the magnetic unit 130 may allow a magnetic field to change with respect to the magnetic body 230 of the mating connector 200. That is, the magnetic unit 130 may be configured to generate a magnetic field, and may be configured so that a magnitude and/or a shape of a magnetic field changes with respect to the mating connector 200, in particular, the magnetic body 230 of the mating connector 200. The magnetic unit 130 may change a magnitude of an attractive force for the mating connector 200, that is, a force of attracting the mating connector 200, through the change in the magnetic field.

Furthermore, the magnetic unit 130 may include a magnet to generate and change a magnetic field. In particular, the magnetic unit 130 may include a permanent magnet, for example, a neodymium magnet. In this case, the magnetic unit 130 may not receive separate power to generate or change a magnetic force.

At least a portion of the magnetic unit 130 may be provided in the housing 110. For example, at least a part or the whole of the magnetic unit 130 may be buried in the housing 110.

According to the configuration of the present disclosure, a magnetic field received by the magnetic body 230 of the mating connector 200 may be changed by the magnetic unit 130. Due to the change in the magnetic field, a force of attracting the mating connector 200 may be controlled. That is, the magnetic unit 130 may be configured to strongly attract the mating connector 200 or weaken or remove such an attractive force, by changing a magnetic field with respect to the magnetic body 230 of the mating connector 200.

In particular, the magnetic unit 130 may be configured to generate a magnetic field toward the mating connector 200, in a situation where the mating connector 200 is being coupled. For example, in the configuration as shown in FIG. 1, when the mating connector 200 moves downward as indicated by an arrow A2 to be coupled to the housing 110 of the connector 100 according to the present disclosure, the magnetic unit 130 may generate a magnetic field to the magnetic body 230 of the mating connector 200. In this case, the magnetic body 230 of the mating connector 200 may receive a force attracted to the magnetic unit 130 due to a magnetic force. Accordingly, the mating connector 200 may be more easily coupled to the housing 110 of the connector 100 according to the present disclosure. Hence, according to this configuration of the present disclosure, fastening between the connector 100 according to the present disclosure and the mating connector 200 may be more easily performed.

Also, the magnetic unit 130 may be configured to generate a magnetic field toward the mating connector 200, in a situation where the mating connector 200 is already coupled. For example, as shown in FIG. 2, when the mating connector 200 is coupled to the connector 100 according to the present disclosure, the magnetic body 230 of the mating connector 200 may continuously receive an attractive force from the magnetic unit 130. Accordingly, in this case, the mating connector 200 including the magnetic body 230 may more stably maintain a mechanical coupled state with the connector 100 according to the present disclosure. Hence, according to this configuration of the present disclosure, unintentional separation (removal) between the connector 100 according to the present disclosure and the mating connector 200 may be more effectively prevented.

The magnetic unit 130 may be configured to weaken or remove a magnetic field, with respect to the magnetic body 230 of the mating connector 200. That is, the magnetic unit 130 may be configured to weaken or remove a force of attracting the mating connector 200 according to a situation. In particular, this configuration may be implemented when the connector 100 according to the present disclosure and the mating connector 200 are intentionally separated from each other. When electrical connection between the connector 100 and the mating connector 200 needs to be released, the mating connector 200 needs to be removed from the connector 100 according to the present disclosure. For example, in FIG. 2, as indicated by an arrow A4, a situation where the mating connector 200 should be separated from the housing 110 of the connector 100 according to the present disclosure may occur. In this case, when a magnetic field of the magnetic unit 130 with respect to the magnetic body 230 of the mating connector 200 is reduced or removed, separation of the mating connector 200 may be more easily performed.

As such, according to this configuration of the present disclosure, coupling between the connector 100 according to the present disclosure and the mating connector 200 may be stably maintained, and insertion and separation of the mating connector 200 may also be easily performed.

A configuration in which the magnetic unit 130 changes a magnetic field may be implemented by various embodiments, which will be described below in more detail.

The coupling portion 110G of the housing 110 may be formed as a concave groove into which the mating connector 200 is inserted. For example, as shown in FIGS. 1 and 2, the housing 110 may include an opening formed at a central portion of an upper end, and the opening may longitudinally extend from up to down (−z axis direction) to form the coupling portion 110G. A portion of the conductor unit 120 is exposed on a surface of the coupling portion 110G, that is, an inner surface of the groove.

In this case, the mating connector 200 may be inserted into the opening of the housing 110 and may move downward (as indicated by the arrow A2 of FIG. 1) into the groove (coupling portion 110G), to be fastened to the connector 100 according to the present disclosure. When the mating connector 200 is inserted, as shown in FIG. 2, the mating connector 200 and the connector 100 according to the present disclosure may be electrically connected to each other. In a more specific example, the mating connector 200 may include the conductor contact portion 220 on a side surface thereof, as shown in FIG. 1. In this case, when the mating connector 200 is inserted into the groove, that is, the coupling portion 110G, of the housing 110, the conductor contact portion 220 of the mating connector 200 and the exposed portion (contact point) of the conductor unit 120 of the connector 100 according to the present disclosure may directly contact each other.

According to this configuration of the present disclosure, the mating connector 200 may be easily coupled to the housing 110 of the connector 100 according to the present disclosure. Due to the coupling, electrical connection between the mating connector 200 and the connector 100 according to the present disclosure may also be easily performed.

In particular, the coupling portion 110G of the housing 110 may be formed in a cylindrical shape, that is, a circular cylindrical shape, as shown in FIG. 1. In other words, when looking at a cross-section of the housing 110 in a direction parallel to an x-y plane, an inner surface of the housing 110, that is, a surface of the coupling portion 110G, may be formed in a circular shape. Furthermore, in the housing 110, a thread S1 may be formed on an inner surface of the groove (coupling portion 110G), as shown in FIGS. 1 and 2. The housing 110 may be configured so that the mating connector 200 is rotatably inserted through the thread S1.

Also, the mating connector 200 may be formed to correspond to a shape of the coupling portion 110G of the housing 110. For example, the main body 210 of the mating connector 200 may be formed in a cylindrical (circular cylindrical) shape, and may be inserted into the coupling portion 110G of the housing 110. The conductor contact portion 220 may be provided on a side portion of the main body 210 of the mating connector 200. A thread S2 may be formed on a surface of the conductor contact portion 220 of the mating connector 200 and/or a contact portion of the main body 210 to correspond to the thread S1 formed on the surface of the coupling portion 110G.

The mating connector 200 may rotate as indicated by an arrow A3 in FIG. 1, to be inserted into the groove of the housing 110, that is, the coupling portion 110G. In this case, the connector 100 according to the present disclosure and the mating connector 200 may be coupled to each other in a screw method. According to this configuration of the present disclosure, because a coupling force by a magnetic force of the magnetic unit 130 and a coupling force by a screw method work together, a coupling force between the mating connector 200 and the connector 100 according to the present disclosure may be more stably secured. Furthermore, according to this configuration, an operation of inserting or separating the mating connector 200 into or from the housing 110 may also be easily performed.

The magnetic unit 130 may include a first magnet 131 and a second magnet 132. That is, the magnetic unit 130 may include at least two magnets. Each of the first magnet 131 and the second magnet 132 may be configured as a multi-pole magnet. For example, each of the first magnet 131 and the second magnet 132 may be configured as a 4-pole magnet including two S poles and two N poles on one surface, as shown in FIGS. 1 and 2. In more detail, each of the first magnet 131 and the second magnet 132 may be a neodymium magnet having 4 magnetic poles.

Also, the first magnet 131 and the second magnet 132 may face each other. In particular, the first magnet 131 and the second magnet 132 may have different poles located on facing surfaces. For example, as shown in FIGS. 1 and 2, the first magnet 131 and the second magnet 132 may be respectively located at an upper position and a lower position, and a bottom surface of the first magnet 131 and a top surface of the second magnet 132 may face each other. N poles and S poles may be located on both the bottom surface of the first magnet 131 and the top surface of the second magnet 132.

The first magnet 131 and the second magnet 132 may be spaced apart from each other by a certain distance. For example, the first magnet 131 and the second magnet 132 may be vertically spaced apart from each other. Furthermore, when magnetic forces of the first magnet 131 and the second magnet 132 are different from each other, for example, when a magnetic force of the first magnet 131 is greater than a magnetic force of the second magnet 132, the first magnet 131 and the second magnet 132 may be configured to be separated from each other. Alternatively, the first magnet 131 and the second magnet 132 may be vertically located to contact each other. Furthermore, when magnetic forces of the first magnet 131 and the second magnet 132 are the same, the first magnet 131 and the second magnet 132 may be configured to contact each other.

According to this configuration of the present disclosure, due to two magnets configured as a multi-pole magnet, a configuration of changing a magnetic force with respect to the mating connector 200 may be more easily implemented.

The magnetic unit 130, in particular, the first magnet 131 and the second magnet 132, may be located around the coupling portion 110G of the housing 110. For example, the first magnet 131 and the second magnet 132 may be located under the coupling portion 110G. The mating connector 200 may move downward and may be coupled to the coupling portion 110G. Accordingly, the mating connector 200, in particular, the magnetic body 230 of the mating connector 200, may be affected by a magnetic field by the first magnet 131 and the second magnet 132 located under the mating connector 200.

Furthermore, as shown in the drawings, when the mating connector 200 is inserted into the coupling portion 110G of the housing 110, the first magnet 131 may be located under the magnetic body and the second magnet 132 may be located under the first magnet 131. In this case, the mating connector 200 may be mainly affected by a magnetic field by the first magnet 131. In this case, the first magnet 131 may function as a main magnet, and the second magnet 132 may function as a control magnet. That is, the first magnet 1321 may mainly supply a magnetic field to the mating connector 200, and the second magnet 132 may mainly control the amount of a magnetic field supplied to the mating connector 200.

At least one of a plurality of magnets provided in the magnetic unit 130 may be configured to be movable. In particular, the second magnet 132 may be configured to be movable. The second magnet 132 may be configured to change a magnetic field of the first magnet 131 toward the magnetic body 230 of the mating connector 200, due to this movement. In this case, the first function 131 may be fixed to the inside of the housing 110 as a main magnet, and the second magnet 132 may function as a control magnet for changing a magnetic field of the first magnet 131 through the movement.

According to this configuration of the present disclosure, the magnetic unit 130 may adjust an attractive force for the mating connector 200, by changing a magnetic field with respect to the magnetic body 230 of the mating connector 200 through movement of the second magnet 132.

In particular, the second magnet 132 may be configured to be rotatable, which will be described in more detail with reference to FIG. 3.

Figure 3A:
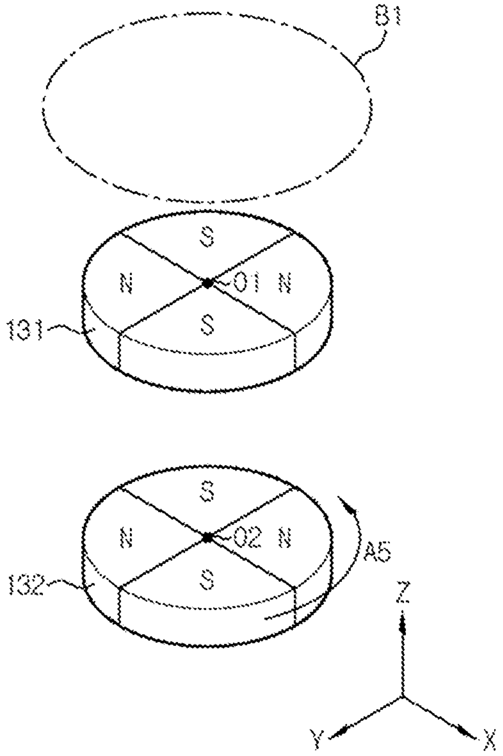
FIGS. 3A-B are views schematically illustrating operations of a magnetic unit according to an embodiment of the present disclosure.
Figure 3B:
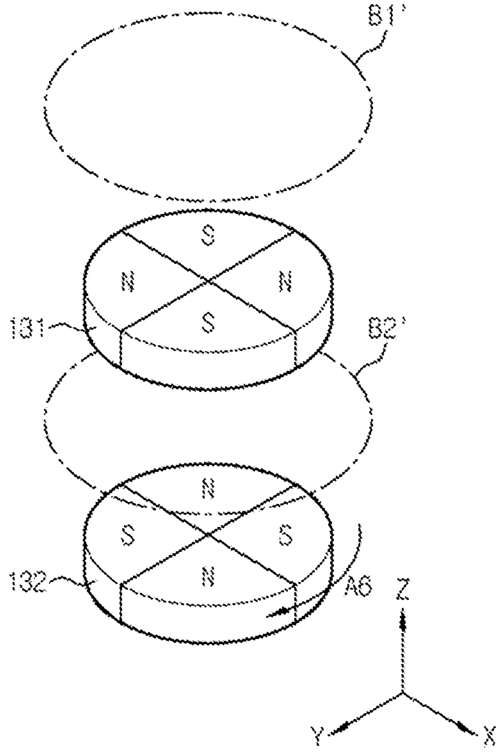

FIG. 3 is a view schematically illustrating an operation of the magnetic unit 130 according to an embodiment of the present disclosure.

Referring to FIG. 3, each of the first magnet 131 and the second magnet 132 provided in the magnetic unit 130 may be formed in a plate shape having a wide surface in a horizontal direction. Alternatively, each of the first magnet 131 and the second magnet 132 may be formed in a pillar shape having flat top and bottom surfaces. Furthermore, surfaces of the first magnet 131 and the second magnet 132 facing each other may be flat. Both poles may be located on the surfaces of the first magnet 131 and the second magnet 132 facing each other. In this case, the second magnet 132 may be configured to be rotatable as indicated by an arrow A5 in (a) of FIG. 3. That is, a center point O2 of the second magnet 132 may be located at the same position as a center point O1 of the first magnet 131 in x-y coordinates, and may be located at a position different from the center point O1 of the first magnet 131 along a z-axis. The second magnet 132 may be configured to be rotatable clockwise or counter-clockwise around the center point O2.

Furthermore, the second magnet 132 may be configured to change a position of a pole with respect to the first magnet 131 through the rotation. For example, as shown in FIG. 3, in a state where both the first magnet 131 and the second magnet 132 are configured as 4-pole magnets, when the first magnet 132 is fixed and the second magnet 132 rotates in a direction indicated by the arrow A5, poles at portions of the first magnet 131 and the second magnet 132 facing each other may be changed.

In a more specific example, as shown in (a) of FIG. 3, in a state where the same poles of the first magnet 131 and the second magnet 132 face each other, when the second magnet 132 rotates by 90° in a direction indicated by the arrow A5, the second magnet 132 may be in a state as shown in (b) of FIG. 3. That is, in (b) of FIG. 3, different poles of the first magnet 131 and the second magnet 132 configured as 4-pole magnets may face each other. In a state where the magnetic unit 130 is located as shown in (b) of FIG. 3, when the second magnet 132 rotates by 90° in a direction indicated by an arrow A6, the second magnet 132 may be in a state as shown in (a) of FIG. 3. In this case, the same poles of the first magnet 131 and the second magnet 132 may face each other.

According to this configuration, the first magnet 131 and the second magnet 132 are configured so that facing poles are changed when at least one of the first magnet 131 and the second magnet 132 rotates. In particular, through the relative rotation, the same poles or different poles of the first magnet 131 and the second magnet 132 may face each other. According to a change in facing polarities of the first magnet 131 and the second magnet 132, a magnetic field of the magnetic unit 130 may be changed.

For example, in (a) of FIG. 3, because the same poles of the first magnet 131 and the second magnet 132 face each other, there may be a strong magnetic field mainly by the first magnet 131, in a portion B1 over the first magnet 131. Accordingly, when the magnetic body 230 of the mating connector 200 is located at the portion B1, the magnetic body 230 may be attracted toward the first magnet 131.

In contrast, in (b) of FIG. 3, because different poles of the first magnet 131 and the second pole 132 face each other, a magnetic field by the first magnet 131 may be mainly formed toward the second magnet 132. That is, in this case, there may be a magnetic field by the first magnet 131 mainly in a portion B2' between the first magnet 131 and the second magnet 132 in a vertical direction (z axis direction). Also, there may be no or a very weak magnetic field by the first magnet 131, in a portion B1' over the first magnet 131. That is, a magnetic field of the portion B1' in (b) of FIG. 3 may be less than a magnetic field of the portion B1 in (a) of FIG. 3. Accordingly, even when the magnetic body 230 of the mating connector 200 is located at the portion B1', the magnetic body 230 may not receive an attractive force or may receive a significantly reduced attractive force toward the first magnet 131, and thus the mating connector 200 including the magnetic body 230 may easily move upward (+z axis direction).

According to this configuration of the present disclosure, both a coupling force and workability of the connector 100 may be improved.

For example, an operator may easily couple the mating connector 200, by configuring the second magnet 132 as shown in (a) of FIG. 3. That is, in (a) of FIG. 3, when the mating connector 200 moves to the portion B1, the mating connector 200 may easily move to the portion B1 due to an attractive force by the first magnet 131. The portion B1 may correspond to the coupling portion 110G of the housing 110, in the configuration of FIGS. 1 and 2. Accordingly, when the second magnet 132 is located as shown in (a) of FIG. 3, the mating connector 200 may be easily inserted into an insertion portion of the housing 110.

Also, the operator may continue to stably maintain a coupled state between the mating connector 200 and the connector 100 according to the present disclosure, by maintaining the second magnet 132 as shown in (a) of FIG. 3. That is, in (a) of FIG. 3, because an attractive force by the magnetic unit 130 is continuously applied to the mating connector 200, in particular, the magnetic body 230 of the mating connector 200, the mating connector 200 may not be easily separated upward from the portion B1. Accordingly, when the second magnet 132 is located as shown in (a) of FIG. 3, a state in which the mating connector 200 is inserted into the insertion portion of the housing 110 may be stably maintained.

Also, the operator may easily separate the mating connector 200, by configuring the second magnet 132 as shown in (b) of FIG. 3. For example, when the mating connector 200 is to be separated from the coupling portion 110G of the housing 110, the second magnet 132 may rotate by 90° as indicated by the arrow A5, in (a) of FIG. 3. Then, because the second magnet 132 is located as shown in (b) of FIG. 3, an attractive force by the first magnet 131 and the second magnet 132 may be removed or reduced at the portion B1'. Accordingly, when the second magnet 132 is located as shown in (b) of FIG. 3, the mating connector 200 may be easily removed upward from the insertion portion of the housing 110.

In this configuration, the second magnet 132 may be configured to be rotatable in various ways. For example, the second magnet 132 may include a handle such as a protrusion at a lower portion, and the operator may manually rotate the second magnet 132 in a direction indicated by the arrow A5 (counterclockwise) or a direction indicated by the arrow A6 (clockwise). Alternatively, the second magnet 132 may be configured to be automatically rotatable by rotation of a motor or the like.

At least one of the first magnet 131 and the second magnet 132, in particular, the second magnet 132, may be formed in a plate shape. In this case, one of wide surfaces of the second magnet 132 may face a surface of the first magnet 131. That is, as shown in FIG. 3, when the first magnet 131 and the second magnet 132 are located in the vertical direction, the second magnet 132 may be located under the first magnet 131 and a top surface of the second magnet 132 may face a bottom surface of the first magnet 131.

Furthermore, when the second magnet 132 is configured to be rotatable, the second magnet 132 may be rotatable along an edge of a plate. In particular, the second magnet 132 may be formed in a circular plate shape. In this case, the second magnet 132 may be rotatable in a circumferential direction with respect to the center O2 of the circular plate.

According to this configuration of the present disclosure, a magnetic field of the magnetic unit 130 may be adjusted with a relatively simple structure. In particular, according to this configuration, a separate space for rotating the second magnet 132 may not be required or may be small. Also, according to this configuration, rotation of the second magnet 132 may be easily performed.

The magnetic unit 130 may further include edge members 133, which will be described in more detail with reference to FIGS. 4 and 5.

Figure 4:
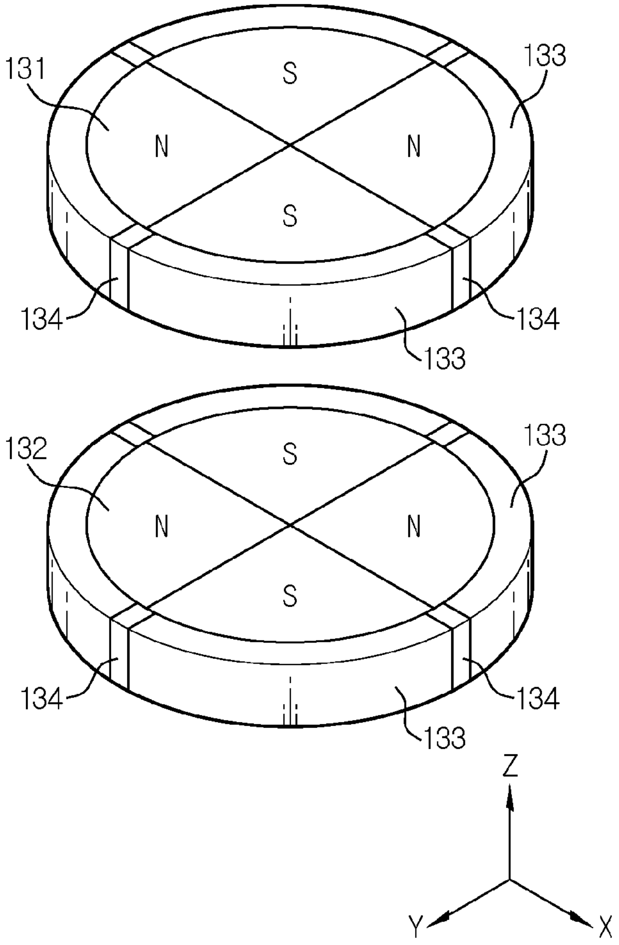
FIG. 4 is a perspective view schematically illustrating at least a part of a magnetic unit according to another embodiment of the present disclosure.

FIG. 4 is a perspective view schematically illustrating at least a part of the magnetic unit 130 according to another embodiment of the present disclosure. FIG. 5 is a view schematically illustrating a top surface of the second magnet 132 of FIG. 4. In the present embodiment, a difference from the above embodiments will be mainly described, and a detailed description of the same or similar parts as or to in the above embodiments will be omitted.

Figure 5:
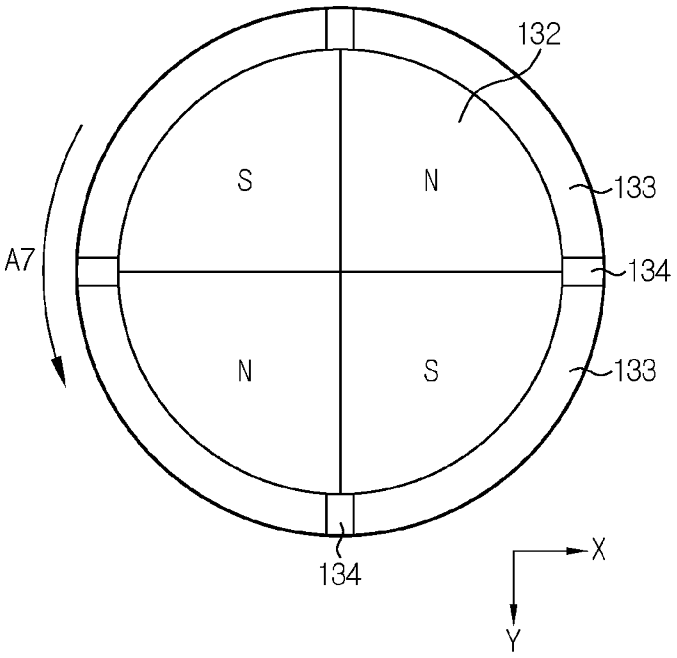
FIG. 5 is a view schematically illustrating a top surface of a second magnet of FIG. 4.

Referring to FIGS. 4 and 5, the magnetic unit 130 may include the edge members 133 on an edge of at least one of the first magnet 131 and the second magnet 132. The edge members 133 may be formed of a ferromagnetic material, for example, a metal material such as iron, cobalt, or nickel. The edge members 133 may be spaced apart from each other for each pole. Furthermore, the edge members 133 may be separated according to poles and may be spaced apart from each other.

For example, when the second magnet 132 has a circular plate shape and is configured as a 4-pole magnet including two N poles and two S poles, four edge members 133 may be separated from each other and may be located on the edges of the N poles and the S poles. In this case, the four edge members 133 may be formed in a substantially circular ring shape surrounding an edge of the second magnet 132 having a circular shape, and may be spaced apart from each other by a certain distance in a circumferential direction. Each of the four edge members 133 may cover ¼ of the circular edge of the second magnet 132. Also, even for the first magnet 131, like the second magnet 132, four edge members 133 having a substantially circular ring shape may be provided. The edge members 133 provided for the first magnet 131 are formed in the same or similar shape as or to the edge members 133 provided for the second magnet 132, and thus a detailed description thereof will be omitted.

According to this configuration of the present disclosure, a magnetic field may be more smoothly controlled, due to the edge members 133 located around the first magnet 131 and the second magnet 132. In particular, the edge members 133 each located for each pole may provide a path through which a magnetic field generated by the first magnet 131 or the second magnet 132 moves. That is, according to this configuration, a magnetic field may more easily move to the edge members 133 formed of iron or the like than other portions. Furthermore, when the first magnet 131 and the second magnet 132 are located so that different poles face each other as shown in (b) of FIG. 3, there may be a lot of magnetic fields in the space between the first magnet 131 and the second magnet 132. In this case, because the edge members 133 located on an edge of the first magnet 131 and an edge of the second magnet 132 provide a path of a magnetic field, the presence of a magnetic field over the first magnet 131 or under the second magnet 132 may be more effectively prevented. Hence, in this case, an attractive force for the magnetic body 230 of the mating connector 200 in space over the first magnet 131 or a space under the second magnet 132 may be significantly reduced or removed. Accordingly, magnetic force control by rotation of the second magnet 132 may be more effectively performed.

In this configuration, the edge members 133 provided on the first magnet 131 and/or the second magnet 132 may be attached to an edge of each magnet and may be fixed. In this case, the edge members 133 provided on the first magnet 131 and/or the second magnet 132 may contact each magnet and may provide a more reliable path for a magnetic field generated from each magnet. The edge members 133 provided on the edge of the second magnet 132 may be configured to rotate along with the second magnet 132. That is, referring to FIG. 5, the edge members 133 provided on the edge of the second magnet 132 may be fixed to the second magnet 132 and may rotate in a direction indicated by an arrow A7 along with the second magnet 132.

Also, the magnetic unit 130 may further include separation members 134. The separation members 134 may be formed of a non-magnetic material, for example, a plastic material. The separation member 134 may be located between the edge members 133 that are each provided for each pole. For example, referring to FIGS. 4 and 5, on the edge of the second magnet 132 configured as a 4-pole magnet, four edge members 133 and four separation members 134 may be alternately arranged.

According to this configuration, a magnetic field polarity of each edge member 133 may be more reliably distinguished by each separation member 134. Hence, in this case, a magnetic field change of the magnetic unit 130 due to rotation of the second magnet 132 in the circumferential direction may be more reliably made.

Figure 6:
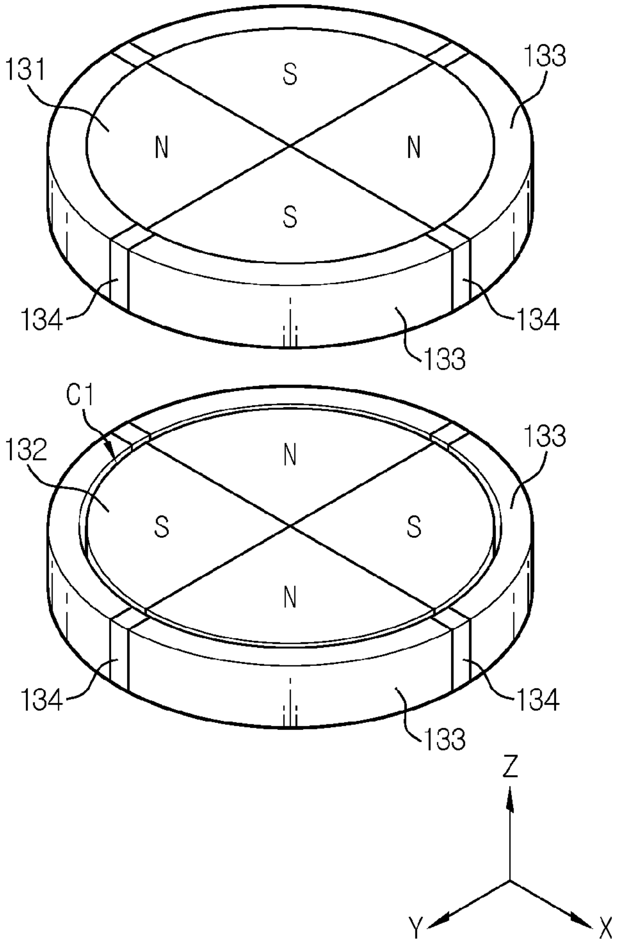
FIG. 6 is a perspective view schematically illustrating at least a part of a magnetic unit according to another embodiment of the present disclosure.
Figure 7:
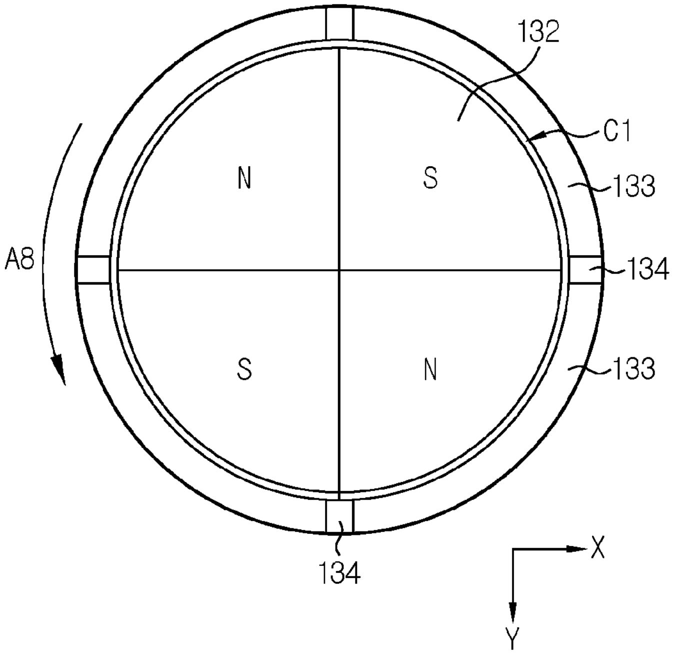
FIG. 7 is a view schematically illustrating a top surface of a second magnet of FIG. 6.

FIG. 6 is a perspective view schematically illustrating at least a part of the magnetic unit 130 according to another embodiment of the present disclosure. FIG. 7 is a view schematically illustrating a top surface of the second magnet 132 of FIG. 6. In the present embodiment, a difference from the above embodiments will be mainly described.

Referring to FIGS. 6 and 7, four edge members 133 may be located in a circular ring shape on the edges of the first magnet 131 and the second magnet 132, and the edge members 133 located on the edge of the second magnet 132 may be spaced apart by a certain distance from the second magnet 132. That is, as shown in a portion C1 of FIG. 7, the edge members 133 may be spaced apart by a certain distance from the edge of the second magnet 132.

In this configuration, only the second magnet 132 may rotate, and the edge members 133 located on the edge of the second magnet 132 may not rotate. That is, the second magnet 132 may rotate in a circumferential direction as indicated by an arrow A8 in FIG. 7, and in this case, the edge members 133 may be maintained in a fixed state. Hence, according to this configuration of the present disclosure, because only the second magnet 132 rotates in an inner space of the edge members 133 and the edge members 133 do not rotate, a space for rotating the edge members 133 does not need to be secured in the magnetic unit 130 or the housing 110.

Also, when the edge members 133 are provided on both the first magnet 131 and the second magnet 132, the edge members 133 provided on different magnets may contact each other, which will be described in more detail with reference to FIG. 8.

Figure 8:
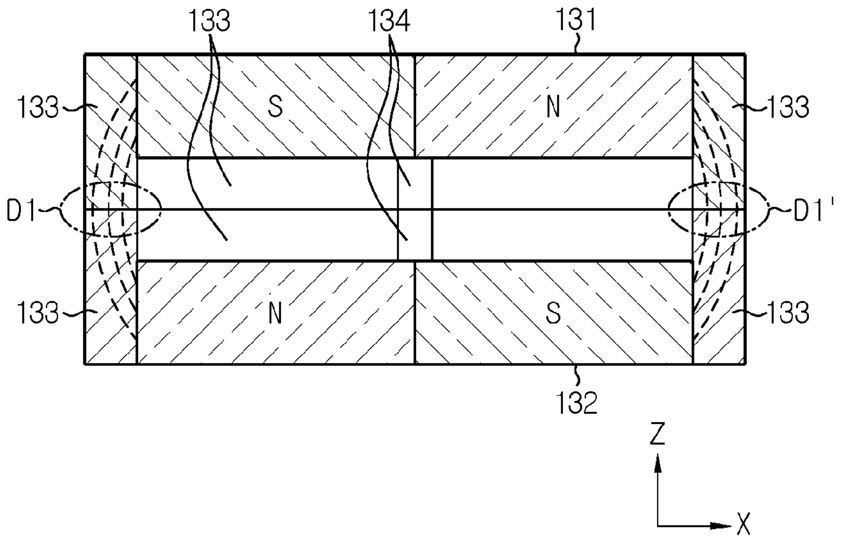
FIG. 8 is a cross-sectional view illustrating at least a part of a magnetic unit according to another embodiment of the present disclosure when viewed from the front.

FIG. 8 is a cross-sectional view illustrating at least a part of the magnetic unit 130 according to an embodiment of the present disclosure when viewed from the front. In the present embodiment, a difference from the above embodiments will be mainly described.

Referring to FIG. 8, the edge members 133 located on edges of the first magnet 131 and the second magnet 132 may contact each other, as in portions D1 and D1'. In particular, the edge members 133 located on the edge of the first magnet 131 and the edge members 133 located on the edge of the second magnet 132 may protrude toward each other. For example, the edge members 133 located on the edge of the first magnet 131 which is relatively in an upper position may protrude further downward than the first magnet 131. The edge members 133 located on the edge of the second magnet 132 which is relatively in a lower position may protrude further upward than the second magnet 132. Upper ends and lower ends of the protruding edge members 133 may contact each other.

According to this configuration of the present disclosure, a magnetic field path may be more reliably formed due to the edge members 133 located on the edge of the first magnet 131 and the edge members 133 located on the edge of the second magnet 132. For example, as shown in FIG. 8, when the first magnet 131 and the second magnet 132 are located so that different poles face each other, a magnetic field between the first magnet 131 and the second magnet 132 may be mainly formed as indicated by a dashed line in FIG. 8. In this case, because the edge members 133 located on the edge of the first magnet 131 and the edge members 133 located on the edge of the second magnet 132 contact each other, a magnetic field path due to the edge members 133 may be more reliably provided.

Figure 9:
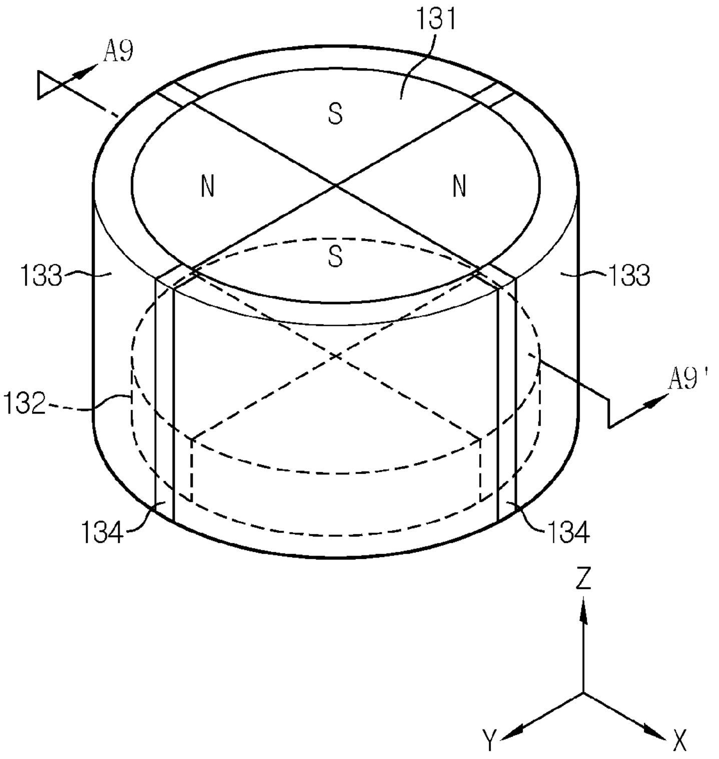
FIG. 9 is a perspective view schematically illustrating at least a part of a magnetic unit according to another embodiment of the present disclosure.
Figure 10:
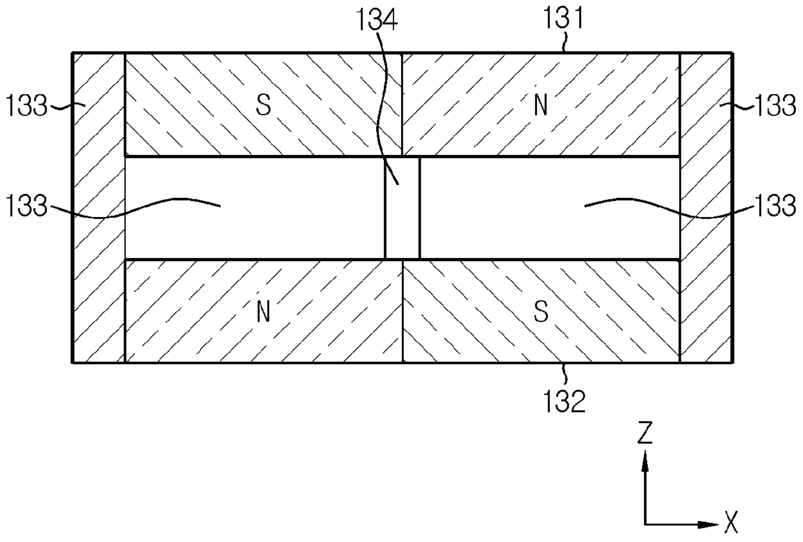
FIG. 10 is a cross-sectional view taken along line A9-A9' of FIG. 9. Even in the present embodiment, a difference from the above embodiments will be mainly described.

FIG. 9 is a perspective view schematically illustrating at least a part of the magnetic unit 130 according to another embodiment of the present disclosure. In FIG. 9, for convenience of explanation, a portion of the magnetic unit 130 is shown as transparent. FIG. 10 is a cross-sectional view taken along line A9-A9' of FIG. 9. In the present embodiment, a difference from the above embodiments will be mainly described.

Referring to FIGS. 9 and 10, the edge members 133 located on an edge of the first magnet 131 and the edge members 133 located on an edge of the second magnet 132 may be integrally formed with each other. That is, the magnetic unit 130 according to the present disclosure may include four edge members 133, and each edge member 133 may surround both the edges of the first magnet 131 and the second magnet 132. In particular, one end of each edge member 133 may surround a part of the edge of the first magnet 131, and the other end of the edge member 133 may surround a part of the edge of the second magnet 132.

For example, when the magnetic unit 130 according to the present disclosure is viewed from up to down, each of the four edge members 133 may surround each quadrant of the first magnet 131 and the second magnet 132. In more detail, an upper end of one edge member 133 may surround a first quadrant of the first magnet 131, and a lower end of the edge member 133 may surround a first quadrant of the second magnet 132. An upper end of another edge member 133 may surround a second quadrant of the first magnet 131, and a lower end of the other edge member 133 may surround a second quadrant of the second magnet 132. Upper ends of the four edge members 133 may surround first through fourth quadrants of the first magnet 131, and lower ends of the four edge members 133 may surround first through fourth quadrants of the second magnet 132.

According to this configuration of the present disclosure, because the edge members 133 located on the edge of the first magnet 131 and the edge members 133 located on the edge of the second magnet 132 are not separated from each other, the structural stability of the magnetic unit 130 may be improved. Also, according to this configuration, a magnetic field path may be continuously formed by the edge members 133 from the edge of the first magnet 131 to the edge of the second magnet 132. Hence, in this case, a change in a magnetic field path due to movement of the second magnet 132 may be more reliably controlled.

In this configuration, the separation members 134 located on the edge of the first magnet 131 and the separation members 134 located on the edge of the second magnet 132 may also be integrally formed with each other. In this case, each separation member 134 may be formed in a quadrangular plate shape that is vertically upright.

Although a configuration in which a magnetic field of the magnetic unit 130 is changed due to rotation of the second magnet 132 has been described in the above embodiments, the present disclosure is not limited thereto.

Figure 11:
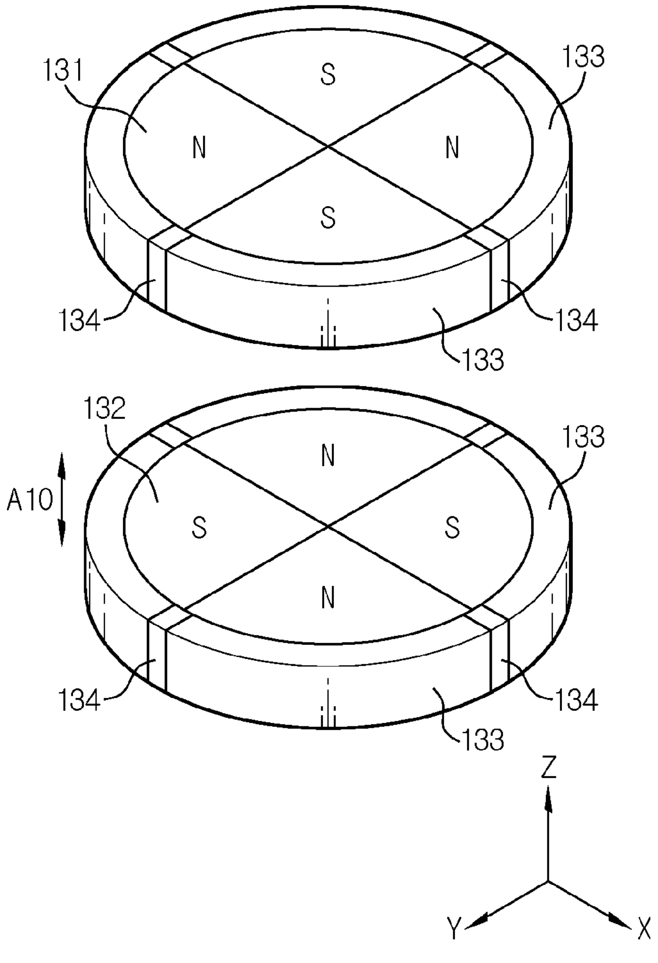
FIG. 11 is a perspective view schematically illustrating at least a part of a magnetic unit according to another embodiment of the present disclosure.

FIG. 11 is a perspective view schematically illustrating at least a part of the magnetic unit 130 according to another embodiment of the present disclosure. In the present embodiment, a difference from the above embodiments will be mainly described.

Referring to FIG. 11, the first magnet 131 and the second magnet 132 may be configured as 4-pole magnets and may be vertically located. In this case, the first magnet 131 and the second magnet 132 may be configured so that different poles face each other. The first magnet 131 and the second magnet 132 may be configured so that a distance between the first magnet 131 and the second magnet 132 is adjustable. For example, in FIG. 11, in a state where the first magnet 131 is fixed, the second magnet 132 may move vertically as indicated by an arrow A10.

According to this configuration of the present disclosure, due to movement of the second magnet 132, a magnetic field affecting a space over the first magnet 131 may be changed. That is, when the second magnet 132 moves upward, the influence of a magnetic field on a space over the first magnet 131 may be reduced. When the first magnet 132 is closer to the first magnet 131 while different polarities face each other, a magnetic field by the first magnet 131 may be directed toward the second magnet 132 rather than toward a space over the first magnet 131. Hence, in this case, when the magnetic body 230 of the mating connector 200 is located over the magnetic unit 130, a force by which the magnetic unit 130 attracts the magnetic body 230 may be weakened or removed. Accordingly, this configuration may be more useful when the mating connector 200 is separated from the housing 110.

In contrast, when the second magnet 132 is farther away from the first magnet 131 while different polarities face each other, a magnetic field by the first magnet 131 may be directed more toward a space over the first magnet 131. Accordingly, when the magnetic body 230 of the mating connector 200 is located over the magnetic unit 130, a force by which the magnetic unit 130 attracts the magnetic body 230 may be strengthened. Hence, this configuration may be useful when the mating connector 200 is inserted into the housing 110 or a coupled state is maintained.

Also, the housing 110 may include an inner housing 111 and an outer housing 112, which will be described in more detail with reference to FIG. 12.

Figure 12:
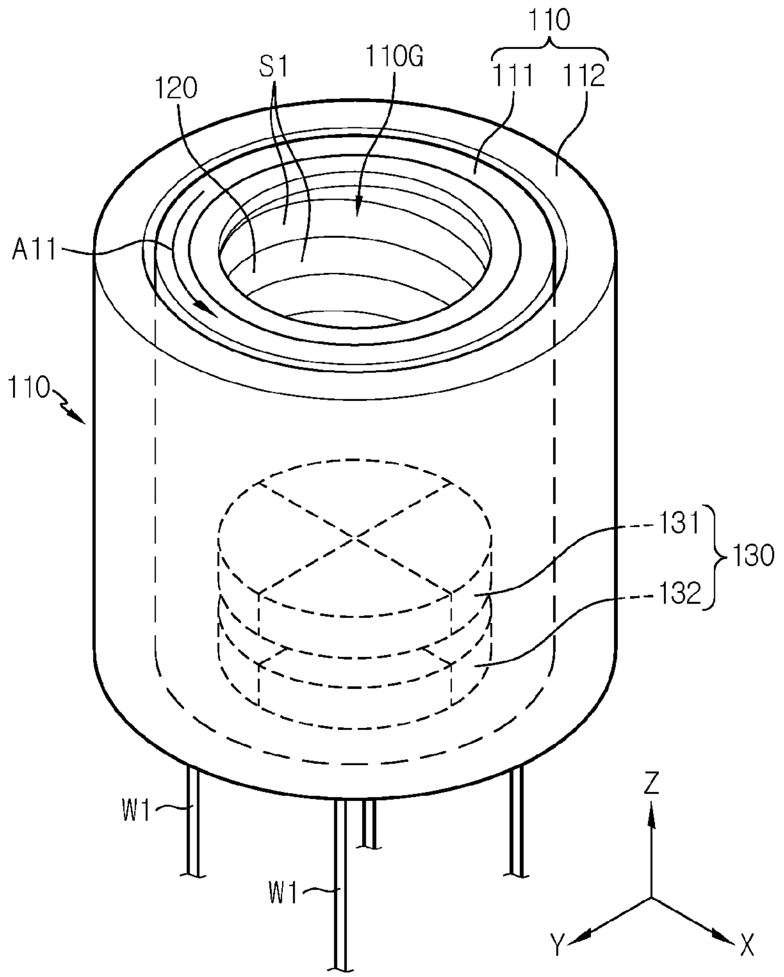
FIG. 12 is a perspective view schematically illustrating a configuration of a connector according to another embodiment of the present disclosure.

FIG. 12 is a perspective view schematically illustrating a configuration of the connector 100 according to another embodiment of the present disclosure. In FIG. 12, for convenience of explanation, at least some elements are shown as transparent. In the present embodiment, a difference from the above embodiments will be mainly described.

Referring to FIG. 12, the housing 110 in the connector 100 according to the present disclosure may include the inner housing 111 and the outer housing 112.

The inner housing 111 may be configured so that an upper end is open and a central portion is concave. In this case, the central portion of the inner housing 111 may function as the coupling portion 110G described above. For example, the mating connector 200 may be inserted into the central portion of the inner housing 111. In this case, as shown in FIG. 12, a thread may be formed on an inner surface of the inner housing 111 so that the mating connector 200 is rotatably coupled to the coupling portion 110G of the inner housing 111 through the thread. Also, the conductor unit 120 may be exposed on the inner surface of the inner housing 111.

The outer housing 112 may surround an outer surface of the inner housing 111. Furthermore, the outer housing 112 may surround the inner housing 111 in front, rear, left, and right directions. That is, the outer housing 112 may have an empty space therein, and the inner housing 111 may be accommodated in the inner space.

In particular, the inner housing 111 may be formed in a circular cylindrical shape, and may be configured to be rotatable in a horizontal direction with respect to a central axis in the inner space of the outer housing 112. In this case, the inner housing 110 may be configured as a component such as a bearing. For example, in a state where the outer housing 112 is fixed, the inner housing 111 may be rotatable counterclockwise as indicated by an arrow A11 in FIG. 12 and/or clockwise.

According to this configuration of the present disclosure, when the mating connector 200 is inserted into the coupling portion 110G of the inner housing 111, the mating connector 200 only needs to move downward (−z axis direction) without having to rotate. That is, when the mating connector 200 moves downward, the inner housing 111 may automatically rotate due to coupling between the thread S2 formed on an outer surface of the mating connector 200 and the thread S1 formed on an inner surface of the inner housing 111. In contrast, when the mating connector 200 is separated (removed) from the coupling portion 110G of the inner housing 111, the mating connector 200 only moves upward (+z axis direction) without having to rotate.

Hence, in this case, coupling and separation of the mating connector 200 may be more easily performed.

The connector 100 according to the present disclosure may be applied to various application devices.

A battery pack according to the present disclosure includes the connector 100 according to the present disclosure. That is, the connector 100 may be applied to the battery pack. For example, the battery pack according to the present disclosure may include the connector 100 according to the present disclosure outside the battery pack, to transmit and receive various data or power for the battery pack. In this case, the mating connector 200 may be provided in a device, for example, a vehicle, on which the battery pack is mounted. Also, the battery pack according to the present disclosure may further include various elements included in the battery pack other than the connector 100, for example, a battery cell, a pack case, and a battery management system.

A vehicle according to the present disclosure includes the connector 100 according to the present disclosure. That is, the connector 100 may be applied to the vehicle. In particular, the vehicle according to the present disclosure may be an electric vehicle or a hybrid vehicle driven by the battery pack. In this case, the vehicle according to the present disclosure may include the connector 100 according to the present disclosure outside a vehicle body, to connect to a battery pack charging device. In this case, the mating connector 200 may be provided in the battery pack charging device. Alternatively, the vehicle according to the present disclosure may include the connector 100 according to the present disclosure inside the vehicle, to electrically connect to the battery pack. In this case, the mating connector 200 may be provided in the battery pack.

A device according to the present disclosure includes the connector 100 according to the present disclosure. The device may be any of various devices such as a vehicle charging device or a server. For example, when the device according to the present disclosure is a charging device for charging an electric vehicle, the device may include the connector 100 according to the present disclosure to connect to the electric vehicle. In this case, the mating connector 200 may be provided in the electric vehicle or a battery pack.

A connecting device according to the present disclosure may include both the connector 100 and the mating connector 200 according to the present disclosure. The mating connector 200 may include the magnetic body 230 such as iron, and may be coupled to the connector 100 capable of adjusting a magnetic field to be electrically connectable, as described above. That is, the connecting device according to the present disclosure may include a first connector and a second connector which are mechanically fastened and electrically connected to each other. In this case, the first connector may be the connector 100 capable of adjusting a magnetic field, and the second connector may be the mating connector 200. In a more specific example, the mating connector 200 that is the second connector may be a male connector, and the first connector 100 may be a female connector. That is, the connecting device according to the present disclosure may include both the male connector and the female connector.

It will be understood by one of ordinary skill in the art that when terms indicating directions such as upper, lower, front, rear, left, and right are used, these terms are only for convenience of explanation and may vary according to a position of a target object, a position of an observer, etc.

While one or more embodiments of the present disclosure have been described with reference to the embodiments and figures, the present disclosure is not limited thereto, and it will be understood by one of ordinary skill in the art that various changes in form and details may be made therein without departing from the scope of the present disclosure as defined by the following claims.

DESCRIPTION OF REFERENCE NUMERALS

100: connector
110: housing, 110G: coupling portion
111: inner housing, 112: outer housing
120: conductor unit
130: magnetic unit
131: first magnet, 132: second magnet, 133: edge member, 134: separation member

200: mating connector

210: main body, 220: conductor contact portion, 230: magnetic body

W1: first wire, W2: second wire

S1, S2: thread

What is claimed is:

1. A connector electrically connected to a mating connector comprising a magnetic body, the connector comprising:

a housing formed of an electrically non-conductive material, and comprising a coupling portion to which the mating connector is fastened;

a conductor unit formed of an electrically conductive material, and configured to provide an electrical path, wherein at least a part of the conductor unit is exposed outside of the housing to electrically contact the mating connector; and a magnetic unit configured to change a magnetic field with respect to the magnetic body of the mating connector, wherein the magnetic unit comprises a first magnet and a second magnet that are each configured as a multi-pole magnet facing each other, wherein the second magnet is configured to be movable to adjust a distance between the first magnet and the second magnet.

2. The connector according to claim 1, wherein the second magnet is configured to be rotatable to adjust locations of poles of the second magnet facing each pole of the first magnet.

3. The connector according to claim 1, wherein the second magnet is plate shaped.

4. The connector according to claim 1, wherein the magnetic unit further comprises edge members formed of a ferromagnetic material, located on an edge of at least one of the first magnet and the second magnet, and spaced apart from each other for each pole.

5. A battery pack comprising the connector according to claim 1.

6. A vehicle comprising the connector according to claim 1.

7. A device comprising the connector according to claim 1.

8. A connecting device comprising: the connector according to claim 1; and a mating connector comprising a magnetic body coupled to the connector to be electrically connectable.

9. A connector electrically connected to a mating connector comprising a magnetic body, the connector comprising:

a housing formed of an electrically non-conductive material, and comprising a coupling portion to which the mating connector is fastened, wherein the coupling portion of the housing is formed as a concave groove into which at least a portion of the mating connector is inserted, wherein the coupling portion of the housing includes a thread formed on an inner surface of the groove and the mating connector is rotatably engageable with the groove;

a conductor unit formed of an electrically conductive material, and configured to provide an electrical path, wherein at least a part of the conductor unit is exposed outside of the housing to electrically contact the mating connector; and a magnetic unit configured to change a magnetic field with respect to the magnetic body of the mating connector.

* * * * *